United States Patent [19]

Kos et al.

[11] Patent Number: 5,462,578
[45] Date of Patent: Oct. 31, 1995

[54] METHOD FOR THE EXTRACTION OF THE METALLIC PHASE FROM DISPERSED MIXTURES OF LIGHT METALS AND NONMETALLIC COMPONENTS

[76] Inventors: Bernd Kos, Endresgasse 11; Harald Marhold, Stollenweg 11/10, both of A-8700 Leoben, Austria

[21] Appl. No.: 247,843

[22] Filed: May 23, 1994

[30] Foreign Application Priority Data

May 24, 1993 [AT] Austria ................................. 1003/93

[51] Int. Cl.$^6$ ....................................................... C22B 9/02
[52] U.S. Cl. ................................................. 75/404; 75/403
[58] Field of Search ......................................... 75/403, 404

[56] References Cited

U.S. PATENT DOCUMENTS

| | | | |
|---|---|---|---|
| 3,136,627 | 6/1964 | Caldwell | 75/205 |
| 3,543,531 | 12/1970 | Adams | 62/124 |
| 3,734,720 | 5/1973 | Starck | 75/10.13 |
| 4,033,563 | 7/1977 | Jakobs | 75/404 |
| 4,948,102 | 8/1990 | Otsuka | 266/205 |

FOREIGN PATENT DOCUMENTS 9301321 1/1993 WIPO .

OTHER PUBLICATIONS

Austrian Patent Office Preliminary Communications Report (in German).

*Primary Examiner*—Peter D. Rosenberg
*Attorney, Agent, or Firm*—Sandler, Greenblum & Bernstein

[57] ABSTRACT

Method for the extraction of the metallic phase from dispersed mixtures of light metals and nonmetallic components. The invention pertains to an advantageous method for the extraction of the metallic phase from a dispersed mixture comprised of at least one light metal and at least one nonmetallic phase and, if applicable, at least the partial separation of the nonmetallic phase. The temperature of the dispersed mixture is raised to a temperature in the region above the melting temperature of the metal or alloy; the heated mixture is then inserted into an apparatus, subjected to an acceleration, and disintegrated, with the metallic phase thereafter being coalesced, collected and allowed to proceed to solidification.

30 Claims, No Drawings

METHOD FOR THE EXTRACTION OF THE METALLIC PHASE FROM DISPERSED MIXTURES OF LIGHT METALS AND NONMETALLIC COMPONENTS

CROSS REFERENCE TO RELATED APPLICATIONS

This application claims the priority of Austrian Application No.A 1003/93, filed May 24, 1993, the disclosure of which is incorporated herein by reference in its entirety.

BACKGROUND OF THE INVENTION

1. Field of the Invention

The invention pertains to a method for the extraction of the metallic phase from a dispersed mixture comprised of at least one light metal, particularly aluminum, or from an alloy of light metals and from at least one nonmetallic phase, formed of at least of one oxide or an oxide of an alloy of these metals, if applicable of one or more additional materials, for example salts or salt mixtures and the like at higher temperatures, particularly waste metals or dross resulting from methods for the production, using, as well as the reclamation of aluminum and aluminum alloys and, if applicable, at least the partial separation of the nonmetal phases thereof.

2. Discussion of the Background of the Invention and Material Information

Light metals, such as aluminum, silicon, magnesium and the like, as well as light metal alloys have a very great affinity for oxygen and nitrogen and react with these gases, which essentially form the atmosphere, in the formation of oxides and nitrides.

Aluminum oxide has a higher specific weight than metallic aluminum, whose outer surface tension and interfacial tension as well as the macrostructure of the oxide, however cause a carrying of the oxide particles at the upper surface or the swimming of the waste metals upon the melt.

A melt-metallurgical extraction, production, reclamation and the like of light metals takes place mostly in air, so that thereby reaction products or nonmetallic phases, particularly oxides, are formed at the outer surface of the melting particles and/or of the melting bath and as a result thereof cover the molten metal.

Prior to a tapping or casting of the liquid metal, the waste metal must be stripped and drawn off. Waste metals however always contain, often actually in appreciable quantity, metal in the form of fine droplets in the spaces between the oxide crystals, wherein such a dispersed mixture often can have a metal content of up to 80%. A simple demetallization of a dispersed mixture, comprised of at least one light metal, particularly aluminum, or of an alloy of light metals and from at least one nonmetallic phase, formed of at least one oxide or an oxide of an alloy or other nonmetallic combinations of these metals, if applicable one or more additional materials, for example salts of salt or salt mixtures and the like, at higher temperatures, particularly waste metals resulting from methods for the production, using, as well as the reclamation of aluminum and aluminum alloys and, if applicable, at least the partial separation of the nonmetallic phases of the waste metals, at the usual temperatures above the melting point of the metal is difficult due to the outer surface tension and the structural properties of the nonmetallic phase, whereby the yield of the melting process is reduced and large quantities of metal remain unused.

The known prior methods and mechanism or apparatuses for the demetallization of waste metals or dross are difficult and/or ineffective, since still considerable amounts of metal remain in the residues. Metal-containing dross or else the high metal contents in the remaining materials in the currently industrially utilized metal recovery methods for dross/slag however are a danger for the environment, so that a safe disposal thereof is coupled with high expense.

SUMMARY OF THE INVENTION

Here this invention provides relief and has as its object to provide a method via which, in a simple manner, the metallic phase can be recovered from dispersed mixtures of dross and slag with high yield and if applicable, nonmetallic phases can be at least partially separated.

This object is achieved by means of the initially noted method in that the dispersed mixture, formed if need be of several single or individual mixtures, is raised to and/or held and/or equalized at a temperature in the region above the melting temperature of the metal or the alloy, whereafter the mixture is brought to preferably temperature controllable, particularly coolable contact areas, of an apparatus having, for example, ingot mold areas, subjected to and disintegrated via an acceleration that is essentially vertical or perpendicular relative to the contact areas or vertical i.e. perpendicular relative to the largest extent of a projection of the contact areas and coalescing the metallic phase on or in the region of the contact areas, collecting same, and, under the influence of the contact areas, permitting same to proceed to solidification.

Specifically this invention pertains to a method for the extraction of the metallic phase from a dispersed mixture comprised of one of at least one light metal and an alloy of light metals and from at least one nonmetallic phase, formed of at least of one of an oxide and an oxide of an alloy and other nonmetallic combinations of said light metals, at higher temperatures, the method comprising, at least one of bringing, holding and equalizing the temperature of the dispersed mixture to a temperature in the region above one of the melting temperature and melting range of one of the metal and the alloy; bringing the mixture to temperature controllable, coolable contact areas, of a disintegrating apparatus, having ingot mold contact areas; subjecting the mixture to disintegration via an acceleration that is essentially one of vertical or perpendicular relative to the contact areas and vertical or perpendicular relative to the largest extent of a projection of the contact areas; coalescing the metallic phase in one of on and in the region of the contact areas; collecting the metallic phase under the influence of the contact areas; and permitting the metallic phase to proceed to solidification.

In a further embodiment of this invention, the method further comprises the allowing of the metallic phase, during the coalescing step to solidify in a manner so that the fluid region of the metal that is starting to solidify, faces away from the contact areas and is essentially free of crystals and precipitations, and exhibits a predetermined thickness; and holding said thickness, via a controlled warming stream, relative to the contact areas, to a thickness of one of the same as and greater than the largest diameter of the particles of the solid metallic phases, particularly of the phases which correspond essentially to phases formed of oxides.

In another embodiment of this invention, the method further includes the introducing of the dispersed mixture into the apparatus, for the coalescence of the liquid metallic particles, at a temperature in the region of 200° to 400° C. above the melting point of one of the metal and the melting region of the alloy.

In yet other embodiments of this invention, the method further includes the subjecting of the dispersed mixture to an essentially radial acceleration or to a radial acceleration of changing intensity.

In still a different embodiment of this invention, the method includes the subjecting of the dispersed mixture to an acceleration comprised of one of acceleration along a path together with radial acceleration and acceleration along a path together with both radial acceleration as well as an additional normal acceleration and radial acceleration together with acceleration along a path as well as an acceleration acting in the direction of the rotating axis, with at least one of the accelerations being of changing intensity.

In yet a differing embodiment of this invention, the method further includes the subjecting of the dispersed mixture, at least for short durations, to an acceleration of at least one time but not exceeding two hundred eighty times the acceleration due to the force of gravity.

In still a further embodiment of this invention, the method further includes the subjecting of the dispersed mixture, at least for short durations, to an acceleration in the range of between ten and twenty times the acceleration due to the force of gravity.

In another differing embodiment of this invention, the method further includes the subjecting of the dispersed mixture to acceleration for achieving between 80% and at least 95% demetallization.

In still a further embodiment of this invention, the method further includes the removing, at one of during and after the coalescence of the metallic phase, the separated nonmetallic phase from the disintegration apparatus in a separated condition.

In a final embodiment of this invention, the dispersed mixture further includes one of salt and salt mixtures, the method further including, at least partially separating at one of during and after the coalescing of the metallic phase, at least one essentially oxidized component and one salt component; and removing these components in a separated form from the disintegration apparatus.

DETAILED DESCRIPTION OF THE PREFERRED EMBODIMENTS

The advantages achieved via this invention are especially apparent in that the dispersed mixture is demetallized to a high degree, that is with a low consumption of energy and a high yield. Via the use of the method of this invention, over 90% of the dispersed finely distributed metal can be coalesced and solidified from dross and can thus be extracted in corresponding pure form for further usage. At the same time, it is important that during an entry or charging into the apparatus that essentially all volume regions of the dispersed mixture are at a temperature that is above the melting temperature of the metal to be extracted. That in the course of this method, the lighter metallic phase, in comparison with the oxide, accumulates in the direction of the acceleration force below the oxide, so that in effect a heavier body floats above a lighter body was surprising to one skilled in the art and can only be interpreted as a combination of the interfacial tensions as well as the outer surface tensions and the structural properties of the nonmetallic phase. During the continuing solidification of the metal there does not occur, as would be expected, the integration of oxide crystals, but rather the formation of a geometric phase interface.

It is particularly advantageous for high purity of the metal, when the coalescing metallic phase is allowed to solidify in such a manner so that the fluid region of the metal that is starting to harden, faces away from the contact areas, and which is essentially free of crystals and precipitations, exhibits a thickness or depth, which, via a particularly controlled warming stream, relative to the contact areas, is held to the same as or greater than the largest diameter of the particles of the solid phases, particularly of the phases which correspond essentially to the phases formed of oxides. At the same time, via a corresponding control of the warming stream, a minimization of the charge time or the process time per filling of the apparatus is achieved.

Both for a quick as well most complete yield or extraction of the metallic phase it is of advantage when the dispersed mixture is introduced or charged into the apparatus, for the coalescence of the liquid metallic particles, at a temperature in the region of 200° to 400° C., preferably up to about 250° C., above the melting point of the metal or the melting region of the alloy.

When, in accordance with one embodiment of this invention, the dispersed mixture is subjected essentially to acceleration along a path and radial acceleration, particularly with changing intensity, this results, particularly at higher dross temperatures, in a quick disintegration and a solidification of especially pure metal. Particularly in view of a simple disintegration apparatus it is preferred that the dispersed mixture is subjected to an essentially radial acceleration.

Both for a quick coalescence of the metal as well as for achieving a high degree of demetallization it has been shown that it is particularly advantageous when the dispersed mixture is subjected at least, at times, to an acceleration comprised of acceleration along a path and radial acceleration and/or acceleration along a path and radial acceleration with an additional normal acceleration and/or acceleration along a path and radial acceleration and an acceleration acting in the direction of the rotating axis, wherein, if applicable, one or more of the acceleration is of changing intensity. Via a "vibration effect" achieved herewith, the macroscopic structure on the nonmetallic components of the dispersed phase mixes is changed and results in greater demetallization as well as, if applicable, in a partial separation of the nonmetallic phases.

In the sense of shortening the time of the method it has proven favorable when the dispersed mixture is subjected at least for short durations, to an acceleration of at least a one time, preferably greater than a three times, but at the most to a two hundred eighty times, preferably at least twenty times, particularly at the most to ten times of the acceleration due to the force of gravity. During the extraction of aluminum and aluminum alloys from the dispersed mixtures or dross, acceleration values of, for example 3 to 7 times greater than the force of gravity are particularly favorable.

When, in accordance with a preferred embodiment of this invention, the dispersed mixture is subjected to acceleration for achieving at least 80% and preferably 95% demetallization, a high efficiency of the method is achieved via a high recovery of reusable metal.

During the recovery of metal from scrap, for example aluminum waste, such as cans or the like, oxygen that is attached thereto or carried therewith can react with the metal and form oxide and act in a retarding or slag-forming manner. With some metallurgical processes, a low melting salt mixture, for example NaCl and KCl, in a ratio of about 1:1 is added or charged in which the added and produced oxide particles are dissolved. By means of this salt addition, the process duration and the metal extraction can be favorably influenced, however an additional nonmetallic phase is formed. In order to minimize costs for an environmentally safe disposal and particularly to keep the new addition of salts low, it can be of advantage, when during or after the coalescence of the metallic phase from a nonmetallic mixture phase at least one of essentially oxide components and one of salt components is at least partially separated and, if applicable, at least one of these components is removed in separated form from the disintegration apparatus and is utilized for recycling or reuse in the metallurgical process.

The invention will now be more fully described by means of the following examples.

Example 1: 20 kg of aluminum dross with a content of metallic aluminum of 75% by mass were removed from a melt container and charged, at a temperature of about 840° C. into a disintegration apparatus in the form of a centrifuge drum of vertical steel construction having an inner diameter of 400 mm and an inner height or extent of 250 mm. After a starting time of 1.5 minutes such a speed was achieved that the innermost layer was subjected to a radial acceleration of 4.5 g. The centrifuge time, at a temperature of 800°–660° C. was 3 minutes. Cooling was achieved from the outside by spraying water on the drum. A closed ring of metallic aluminum with a mass of 15.2 kg was recovered. 4.8 kg of $Al_2O_3$ of disposable, problem-free, sand-like consistency remained having a remainder content of metallic aluminum of about 7% by mass.

Example 2: The process proceeded as already described in example 1 with the use of a vertically arranged centrifuge, but with an additional oscillation movement in the direction of the rotating axis, whose inner chamber at 450 mm inner diameter and a lower part with a stepped smaller inner diameter of 350 mm and an inner height of 200 mm with a total inner height of 500 mm and which acted as an antechamber. After solidification a 15.7 kg mass closed ring of aluminum metal was recovered, which was practically free of oxide inclusions. 4.3 kg of sand-like aluminum oxide contained a remainder content of about 5% aluminum by mass.

Example 3: The process proceeded as described in example 1, however added to the dross were 100 g of a NaCl/KCl mixture at a 1:1 (w/w) ratio. The result was an aluminum ring of 15.5 kg and the remaining aluminum oxide (4.4 kg) contained about 6% metallic aluminum.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A method for the extraction of the metallic phase from a dispersed mixture comprised of one of a light metal and an alloy of light metals and from a nonmetallic phase, formed of at least of one of an oxide and an oxide of an alloy and other nonmetallic combinations of said light metals, at temperatures above the ambient temperature, the method comprising:

at least one of bringing, holding and equalizing the temperature of the dispersed mixture to a temperature in the region above one of the melting temperature and melting range of one of the metal and the alloy;

bringing the mixture to temperature controllable, coolable contact areas, of a disintegrating apparatus, having ingot mold contact areas;

subjecting the mixture to disintegration via an acceleration that is essentially perpendicular relative to the contact areas;

coalescing the metallic phase in one of on and in the region of the contact areas;

collecting the metallic phase under the influence of the contact areas; and permitting the metallic phase to proceed to solidification.

2. The method of claim 1, further comprising the allowing of the metallic phase, during the coalescing step to solidify in a manner so that the fluid region of the metal that is starting to solidify, faces away from the contact areas and is essentially free of crystals and precipitations, and exhibits a predetermined thickness; and holding said thickness, via a controlled warming stream, relative to the contact areas, to a thickness of one of the same as and greater than the largest diameter of the particles of the solid metallic phases which correspond essentially to phases formed of oxides.

3. The method of claim 1, further including the introducing of the dispersed mixture into the apparatus, for the coalescence of the liquid metallic particles, at a temperature in the region of 200° to 400° C. above the melting point of one of the metal and the melting region of the alloy.

4. The method of claim 2, further including the introducing of the dispersed mixture into the apparatus, for the coalescence of the liquid metallic particles, at a temperature in the region of up to 250° C. above the melting point of one of the metal and the melting region of the alloy.

5. The method of claim 1, further including the subjecting of the dispersed mixture to an essentially radial acceleration.

6. The method of claim 2, further including the subjecting of the dispersed mixture to an essentially radial acceleration.

7. The method of claim 3, further including the subjecting of the dispersed mixture to an essentially radial acceleration.

8. The method of claim 1, further including the subjecting of the dispersed mixture to a radial acceleration of changing intensity.

9. The method of claim 1, further including the subjecting of the dispersed mixture to an acceleration comprised of one of acceleration along a path together with radial acceleration and acceleration along a path together with both radial acceleration as well as an additional normal acceleration and radial acceleration together with acceleration along a path as well as an acceleration acting in the direction of the rotating axis, with at least one of the accelerations being of changing intensity.

10. The method of claim 2, further including the subjecting of the dispersed mixture to an acceleration comprised of one of acceleration along a path together with radial acceleration and acceleration along a path together with both radial acceleration as well as an additional normal acceleration and radial acceleration together with acceleration along a path as well as an acceleration acting in the direction of the rotating axis, with at least one of the accelerations being of changing intensity.

11. The method of claim 3, further including the subjecting of the dispersed mixture to an acceleration comprised of one of acceleration along a path together with radial acceleration and acceleration along a path together with both radial acceleration as well as an additional normal acceleration and radial acceleration together with acceleration along a path as well as an acceleration acting in the direction of the rotating axis, with at least one of the accelerations being of changing intensity.

12. The method of claim 5, further including the subjecting of the dispersed mixture to an acceleration comprised of one of acceleration along a path together with radial acceleration and acceleration along a path together with both radial acceleration as well as an additional normal acceleration and radial acceleration together with acceleration along a path as well as an acceleration acting in the direction of the rotating axis, with at least one of the accelerations being of changing intensity.

13. The method of claim 8, further including the subjecting of the dispersed mixture to an acceleration comprised of one of acceleration along a path together with radial acceleration and acceleration along a path together with both radial acceleration as well as an additional normal acceleration and radial acceleration together with acceleration along a path as well as an acceleration acting in the direction of the rotating axis, with at least one of the accelerations being of changing intensity.

14. The method of claim 1, further including the subjecting of the dispersed mixture, at least for short durations, to an acceleration of one time but not exceeding two hundred eighty times the acceleration due to the force of gravity.

15. The method of claim 2, further including the subjecting of the dispersed mixture, at least for short durations, to an acceleration of one time but not exceeding two hundred eighty times the acceleration due to the force of gravity.

16. The method of claim 3, further including the subjecting of the dispersed mixture, at least for short durations, to an acceleration of one time but not exceeding two hundred eighty times the acceleration due to the force of gravity.

17. The method of claim 5, further including the subjecting of the dispersed mixture, at least for short durations, to an acceleration of one time but not exceeding two hundred eighty times the acceleration due to the force of gravity.

18. The method of claim 1, further including the subjecting of the dispersed mixture, at least for short durations, to an acceleration in the range of between ten and twenty times the acceleration due to the force of gravity.

19. The method of claim 2, further including the subjecting of the dispersed mixture, at least for short durations, to an acceleration in the range of between ten and twenty times the acceleration due to the force of gravity.

20. The method of claim 3, further including the subjecting of the dispersed mixture, at least for short durations, to an acceleration in the range of between ten and twenty times the acceleration due to the force of gravity.

21. The method of claim 8, further including the subjecting of the dispersed mixture, at least for short durations, to an acceleration in the range of between ten and twenty times the acceleration due to the force of gravity.

22. The method of claim 1, further including the subjecting of the dispersed mixture to acceleration for achieving at least between 80% and 95% demetallizatlon.

23. The method of claim 2, further including the subjecting of the dispersed mixture to acceleration for achieving at least between 80% and 95% demetallization.

24. The method of claim 3, further including the subjecting of the dispersed mixture to acceleration for achieving at least between 80% and 95% demetallization.

25. The method of claim 9, further including the subjecting of the dispersed mixture to acceleration for achieving at least between 80% and 95% demetallization.

26. The method of claim 14, further including the subjecting of the dispersed mixture to acceleration for achieving at least between 80% and 95% demetallization.

27. The method of claim 18, further including the subjecting of the dispersed mixture to acceleration for achieving at least between 80% and 95% demetallizatlon.

28. The method of claim 1, further including the removing, at one of during and after the coalescence of the metallic phase, the separated nonmetallic phase from the disintegration apparatus in a separated condition.

29. The method of claim 1, wherein the dispersed mixture further includes one of salt and salt mixtures, the method further including, partially separating at one of during and after the coalescing of the metallic phase, at least one essentially oxidized component and one salt component; and removing these components in a separated form from the disintegration apparatus.

30. The method of claim 9, wherein the dispersed mixture further includes one of salt and salt mixtures, the method further including, partially separating at one of during and after the coalescing of the metallic phase, at least one essentially oxidized component and one salt component; and removing these components in a separated form from the disintegration apparatus.

\* \* \* \* \*